United States Patent
Liss et al.

(10) Patent No.: US 12,330,536 B2
(45) Date of Patent: Jun. 17, 2025

(54) CHILD CAR SEAT OCCUPATION DETECTION USING A LASER

(71) Applicant: SLS Innovations LLC, Sparta, NJ (US)

(72) Inventors: Steve Liss, Sparta, NJ (US); Sabina Liss, Sparta, NJ (US)

(73) Assignee: SLS Innovations LLC, Sparta, NJ (US)

( * ) Notice: Subject to any disclaimer, the term of this patent is extended or adjusted under 35 U.S.C. 154(b) by 66 days.

(21) Appl. No.: 18/141,683

(22) Filed: May 1, 2023

(65) Prior Publication Data

US 2023/0347791 A1    Nov. 2, 2023

Related U.S. Application Data

(60) Provisional application No. 63/336,460, filed on Apr. 29, 2022.

(51) Int. Cl.
*B60N 2/00* (2006.01)
*B60N 2/26* (2006.01)
*G08B 21/00* (2006.01)

(52) U.S. Cl.
CPC .......... *B60N 2/0021* (2023.08); *B60N 2/267* (2023.08); *B60N 2/268* (2023.08); *B60N 2/274* (2023.08); *B60Y 2400/90* (2013.01); *B60Y 2400/92* (2013.01)

(58) Field of Classification Search
CPC .......... B60N 2/002; B60N 2/26; B60N 2/268; B60N 2/28; B60N 2/0021; B60Y 2400/90; B60Y 2400/92

USPC .......................................................... 340/438
See application file for complete search history.

(56) References Cited

U.S. PATENT DOCUMENTS

| | | |
|---|---|---|
| 9,014,920 B1 | 4/2015 | Torres et al. |
| 9,266,471 B2 | 2/2016 | Schoenberg et al. |
| 9,815,407 B1 | 11/2017 | Anderson |
| 10,068,452 B1 | 9/2018 | Nunez |
| 10,245,975 B1 | 4/2019 | Waters |
| 10,442,353 B1 | 10/2019 | Norman |

(Continued)

FOREIGN PATENT DOCUMENTS

| | | |
|---|---|---|
| CN | 110271456 A | 9/2019 |
| CN | 112428955 A | 3/2021 |

(Continued)

*Primary Examiner* — Mark S Rushing
(74) *Attorney, Agent, or Firm* — Gearhart Law, LLC

(57) ABSTRACT

A system is described herein. The system includes at least a computing device and an occupation device. The computing device includes an engine and a graphical user interface (GUI). The occupation deice is affixed to a car seat in a vehicle. The occupation device is configured to determine a presence or an absence of a child in the car seat. Specifically, the occupation device includes electrical components and a laser component comprising at least a laser beam that exits a body component of the occupation device at a location. When the laser beam is uninterrupted, the electrical components are configured to transmit a first alert to the engine of the computing device for display to a user via the GUI. When the laser beam is interrupted, the electrical components are configured to transmit a second alert to the engine of the computing device for display to the user via the GUI.

9 Claims, 8 Drawing Sheets

(56) References Cited

U.S. PATENT DOCUMENTS

| | | | |
|---|---|---|---|
| 2013/0278408 A1 | 10/2013 | Schoenberg et al. | |
| 2016/0193960 A1 | 7/2016 | Barabas et al. | |
| 2016/0307432 A1 | 10/2016 | Downs | |
| 2016/0339838 A1 | 11/2016 | Diaz | |
| 2017/0101055 A1* | 4/2017 | Alfaro Fonseca | B60N 2/879 |
| 2018/0009376 A1 | 1/2018 | Johnson | |
| 2018/0056814 A1* | 3/2018 | Tanyi | G08B 21/24 |
| 2019/0168635 A1 | 6/2019 | McLaughlin | |
| 2019/0251820 A1* | 8/2019 | Friedman | G08B 21/0269 |
| 2020/0286354 A1* | 9/2020 | Bloom | G08B 21/0269 |
| 2021/0142642 A1* | 5/2021 | Edri | G08B 21/0294 |

FOREIGN PATENT DOCUMENTS

| | | | | |
|---|---|---|---|---|
| EP | 2574496 A1 * | 4/2013 | | B60N 2/2824 |
| GB | 2324864 B | 1/1999 | | |

* cited by examiner

CHILD CAR SEAT OCCUPATION DETECTION USING A LASER

The present invention claims priority under 35 USC 119 (e) to U.S. Provisional Application No. 63/336,460 filed Apr. 29, 2022, the entire contents of which are incorporated by reference in its entirety.

FIELD OF THE INVENTION

The field of the invention and its embodiments relate to devices for determining an occupancy of a child car seat in a vehicle. More specifically, the present invention and its embodiments relate to an occupation device that is affixed to a car seat in a vehicle and is configured to determine the presence or the absence of a child in the car seat by using a laser component.

BACKGROUND OF THE INVENTION

Child car seats are used to protect infants and young children from being injured when a vehicle collides with another object or stops suddenly. Child car seats are typically located in the back seat of a car. However, parents and caregivers may unintentionally leave the child unattended in the car seat. On hot days, this can result in the child suffering from heat stroke, which can lead to high fever, dehydration, seizures, stroke and death.

To remedy this problem, numerous groups have developed child safety assemblies that inhibit the child from being left unattended in a vehicle. These systems typically sense the weight of the child in the car seat using sensors. However, such systems require numerous components or a specialized and expensive car seat and are often difficult to install. Thus, what is needed is an easy-to-use device that can affix to any car seat regardless of manufacturer, which accurately determines the presence or the absence of the child in the car seat.

Review of Related Technology

US20190168635A1 describes a car seat alarm system. The car seat alarm system includes a weight-sensor plate assembly, a power source, a dashboard sensor, and a portable device, including a speaker. The weight-sensor plate assembly is positioned and configured to detect a weight of a child in a car seat. The weight-sensor plate assembly is in communication with the dashboard sensor, including a transceiver. The dashboard or visor sensor is configured to communicate that a child is present within the car seat. The dashboard sensor is in wireless communication with the portable device, such as a key fob or smartphone. The dashboard sensor is configured to activate an alarm through the speaker when the portable device extends past a predetermined proximity range from the dashboard sensor is reached and if the weight of the child is present within the car seat.

U.S. Pat. No. 10,442,353B1 describes a child safety assembly for inhibiting a child from being left unattended in a vehicle. The child safety assembly includes a sensing unit that may be positioned beneath a child car seat in a vehicle. The sensing unit is turned on when the sensing unit senses weight of a child in the child car seat. An alert unit is positioned in a vehicle within eyesight of a driver. The alert unit is in wireless electrical communication with the sensing unit. The alert unit emits an audible alarm when the sensing unit senses the weight of the child and the driver's side door is opened.

U.S. Pat. No. 9,014,920B1 describes a system and method that uses a combination of sensors and electronics to reliably remind caregivers when they have or are about to leave one or more occupants inside a vehicle.

CN110271456A describes a car seat with a weight measurement alarm function. The car seat comprises a car seat body, four gravity sensors, a controller, and an alarm. The gravity sensors are mounted on the lower part of the car seat body. Upon sensing weight, the gravity sensor transmits a notification to the controller, which sounds the alarm.

U.S. Pat. No. 10,245,975B1 describes a child car seat safety alarm. The child car seat safety alarm is configured to detect the weight of a first individual in the driver's seat and is configured to detect the weight of a second individual in the child safety seat. If the child car seat safety alarm detects the weight of the second individual in the child safety seat but does not detect the weight of the first individual, the child car seat safety alarm initiates audio and/or visual alarms to indicate that the second individual remains in the child safety seat.

U.S. Pat. No. 10,068,452B1 describes a vehicle alert system that is configured to emit an audible alert when a child is left unattended in a vehicle. The system includes a car seat that is positioned in a vehicle. A base unit of the system is positioned upon the seat to be sat upon by the child, thereby facilitating the base unit to detect weight. The base unit is turned on in response to a detection of the weight of the child. A remote unit is carried by the driver of the vehicle. The remote unit is in electrical communication with the base unit. The remote unit emits an audible alarm when the remote unit moves beyond a trigger distance from the base unit and the base unit is turned on (e.g., a child is sitting in the car seat).

US20180009376A1 describes a child vehicle occupancy warning system that includes a pressure sensor for detecting a weight of a child positioned on a car seat. A transmitter is electrically coupled to the pressure sensor. A key fob includes a fob housing, a fob processor, and a fob transceiver. A base unit is positioned on a dashboard of a vehicle and includes a base housing, a base processor mounted in the base housing and a base transceiver for receiving wireless signals from the transmitter and sending and receiving signals with the fob transceiver. The base processor determines when the fob transceiver is beyond a predetermined distance from the base unit. A warning light emitter is electrically coupled to the base transceiver. The base processor turns on the warning light emitter when a weight detection signal is received by the base transceiver and the fob transceiver is beyond the predetermined distance.

U.S. Pat. No. 9,849,728B2 describes a car seat occupancy alert system that includes an occupancy sensor imbedded in or positioned atop a seat portion of an infant car seat in a vehicle. The alert system includes an engine sensor configured to detect when a vehicle engine has been turned off. The occupancy sensor may be electrically connected to a controller (e.g. a control circuit or process). When the engine is deactivated, the controller determines if the car seat is still occupied after a predetermined time and, at first, energizes a dash light as a gentle reminder for the driver to retrieve the child and, later, actuates more aggressive audio and visual alarms to alert the driver and public to a child left in the vehicle.

U.S. Pat. No. 9,815,407B1 describes an unattended child safety seat alert system that is designed to alert travelers when a passenger is left unattended in a safety seat. The unattended child safety seat alert system is a safety system that incorporates a passenger sensor into the safety seat such that the passenger sensor indicates when a passenger is in the safety seat. A control system monitors the passenger sensor and further monitors whether the automobile is in operation. Should the automobile not be operating while a passenger is in safety seat, the unattended child safety seat alert system further monitors the situation and should subsequent conditions be met the unattended child safety seat alert system will issue a plurality of alarms. The unattended child safety seat alert system comprises a passenger sensor, a controller, and a key fob.

US20160339838A1 describes a child car seat alert mechanism that includes weight sensors for determining the presence of a child in the car seat. The child car seat alert mechanism is installed in car whereby the weight sensors activate an indicator for informing a user that the child remains in the child car seat. The car seat alert mechanism whereby the weight sensors activate an indicator for informing a user that the child remains in the child car seat unbuckled and also the driver/passenger is alerted to a child exiting the child car seat after the engine has started. In one embodiment, the present invention provides a child car seat alert mechanism that reminds the driver of the vehicle that the vehicle has stopped and the child remains buckled in the child car seat.

US20160307432A1 describes an alarm system for vehicles to alert distracted parents, guardians, and custodians that their child is present in the locked car. The alarm system has sensors, speakers, and display units. The sensors are weight sensors, which detect the weight of the baby. Sensors are fitted in the back seat of the vehicle. Whenever the child is left in the locked car, the same time sensors will start sending signals to the alarm system. The alarm system has two features for alerting caretakers. First, it alerts caretaker by saying the words "please check back seat." Secondly, it shows signs of car seat in the side view mirror, dash display, and on the steering column. All the parts of the alarm system are connected with the help of wires with each other.

CN112428955A describes a system that includes sensors for detecting the presence of a child in a car seat located in an automobile and a unit for transmitting an alert to a parent or guardian.

Various similar systems exist in the art. However, their means of operation are substantially different from the present disclosure, as the other inventions fail to solve all the problems taught by the present disclosure.

SUMMARY OF THE INVENTION

The present invention and its embodiments relate to devices for determining an occupancy of a car seat in a vehicle. More specifically, the present invention and its embodiments relate to an occupation device that is affixed to a car seat in a vehicle and is configured to determine the presence or the absence of a child in the car seat by using a laser component.

A first embodiment of the present invention describes an occupation device affixed to a car seat in a vehicle. The occupation device is configured to determine a presence or an absence of a child in the car seat. The occupation device includes a body component. The body component comprises a first side disposed opposite a second side and a first end disposed opposite a second end. The body component of the occupation device also includes electrical components and a laser component comprising at least a laser beam that exits the body component at a location. The first side of the body component includes at least a first fixation component and a second fixation component configured to affix the occupation device to a bumper of the car seat. The second side of the body component is configured to contact a bumper of the car seat. It should be appreciated that in other examples, the body component is affixed to other parts of the car seat, such as the sides of the car seat.

When the laser beam is uninterrupted, the electrical components are configured to transmit a first alert to an engine of a computing device for display via a GUI to a user. The first alert correlates to the car seat being unoccupied by the child. When the laser beam is interrupted, the electrical components are configured to transmit a second alert to the engine of the computing device for display via the GUI to the user. The second alert correlates to the car seat being occupied by the child. Each of the first alert and the second alert comprise at least one of textual data, visual data, and audio data. Further, in some examples, the engine is configured to transmit the first alert or the second alert to a database for storage and/or to another computing device for review by a third-party.

A second embodiment of the present invention describes a system. The system includes a computing device and an occupation device. The computing device includes an engine and a graphical user interface (GUI). The occupation device is affixed to a car seat in a vehicle and is configured to determine the presence or the absence of the child in the car seat. The occupation device includes electrical components and a laser component comprising at least a laser beam that exits a body component of the occupation device at a location.

When the laser beam is uninterrupted, the electrical components are configured to transmit a first alert to the engine of the computing device for display via the GUI to a user. The first alert correlates to the car seat being unoccupied by the child. When the laser beam is interrupted, the electrical components are configured to transmit a second alert to the engine of the computing device for display via the GUI to the user. The second alert correlates to the car seat being occupied by the child. Further, each of the first alert and the second alert comprise at least one of textual data, visual data, and audio data. In some examples, the engine is further configured to transmit the first alert or the second alert to a database for storage and/or another computing device for review by a third-party.

DETAILED DESCRIPTION OF THE INVENTION

Figure 1:
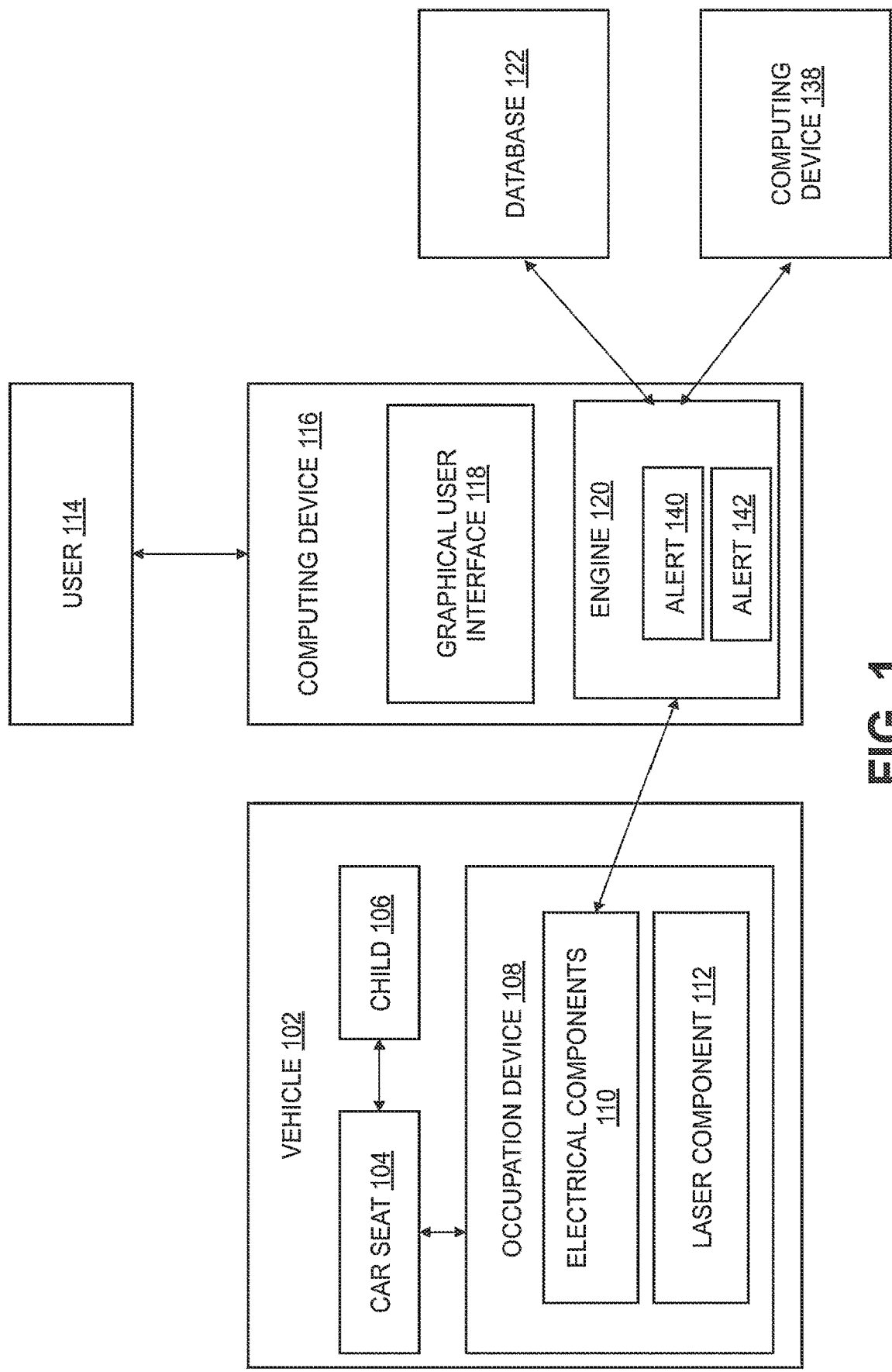
FIG. 1 depicts a schematic diagram of a system comprising a child car seat occupation device, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
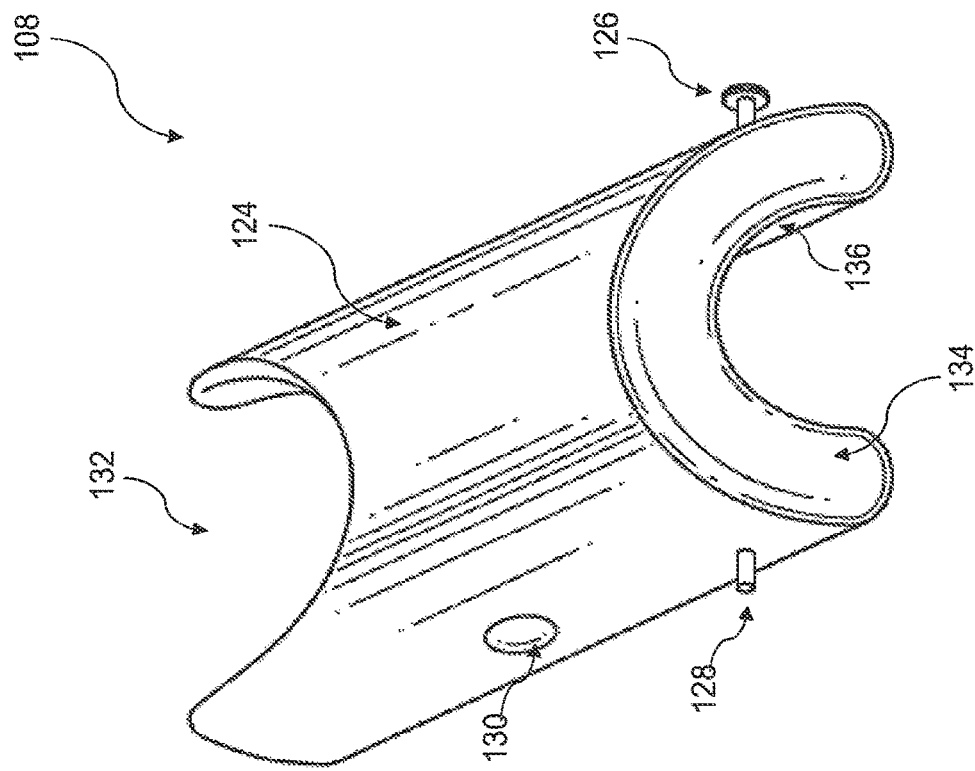
FIG. 2 depicts a schematic diagram of a child car seat occupation device, in accordance with embodiments of the present invention.
Figure 2:
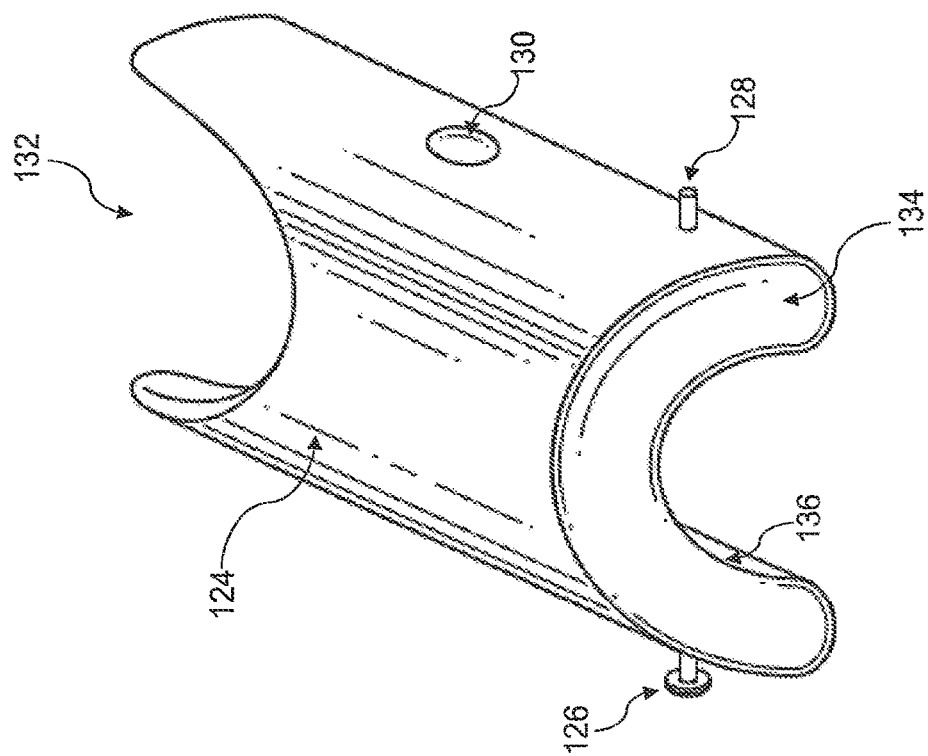
Figure 3:
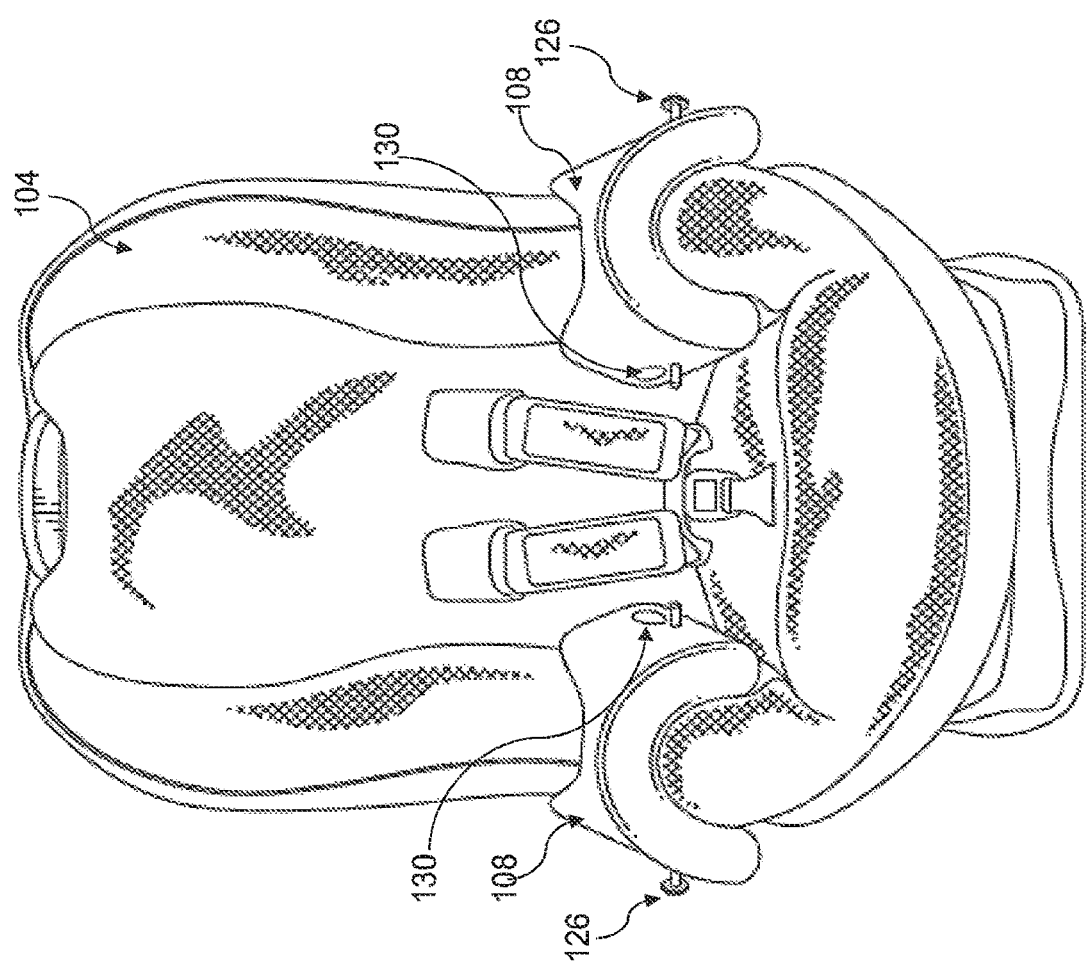
FIG. 3 depicts a schematic diagram of a child car seat occupation device affixed to a car seat, in accordance with embodiments of the present invention.

A system of FIG. 1 includes an occupation device 108 affixed to a car seat 104 in a vehicle 102. A child 106 (e.g., from birth to about 7 years of age) may occupy the car seat 104. The occupation device 108, as shown in FIG. 2 and FIG. 3, includes a body component having a first side 124 disposed opposite a second side 136 and a first end 132 disposed opposite a second end 134. The first end 132 of the occupation device 108 is concave shaped, whereas the second end 134 of the occupation device 108 is U-shaped. Furthermore, the second side 136 of the occupation device 108 comes into contact with a bumper of the car seat 104, as shown in FIG. 3. It should be appreciated that this configuration of the occupation device 108 is for illustrative purposes only and other configurations are contemplated by Applicant herein. For example, in some embodiments, the second side 136 of the occupation device 108 is affixed to another part of the car seat, such as the side of the car seat 104.

A first fixation component 126 and a second fixation component 128 are affixed to the first side 124 of the occupation device 108 and may be used to affix the occupation device 108 onto the bumper of the car seat 104. In examples, each of the first fixation component 126 and the second fixation component 128 may be any type of fixation means. In some examples, the first fixation component 126 and the second fixation component 128 are tightened onto the bumper of the car seat 104 via a clamp or a clamping device. Thus, the occupation device 108 is an easy-to-use device that can be affixed to any car seat regardless of the manufacturer of the car seat.

Further, as shown in FIG. 1, the body component of the occupation device 108 includes electrical components 110 and a laser component 112. In general, a laser is a device that generates light in the form of a laser beam. A laser beam is different from a light beam in that its rays are monochromatic (a single color), coherent (of the same frequency and waveform), and collimated (going in the same direction).

In general, lasers are comprised of three main components: (1) an energy source, (2) a gain medium, and (3) a resonator. The energy source pumps light into a gain medium. It varies according to the type of laser. It could be a laser diode, an electrical discharge, a chemical reaction, a flash lamp, or even another laser. Next, the gain medium emits light of a specific wavelength when excited by the light and is said to be the source of optical gain. Lasers are typically named after their gain medium. In a $CO_2$ laser, for example, the gain medium is $CO_2$ gas. Further, the resonator amplifies the optical gain through mirrors that surround the gain medium. These include bulk mirrors in solid-state lasers, cleaved or coated facets in laser diodes, and Bragg reflectors in fiber lasers.

The laser component 112 may comprise any type of laser that is safe to use. In some examples, the laser component 112 may be a diode-pumped solid-state laser which typically produces a beam of red, green, blue and violet, of higher visible power, typically up to 300 mW. However, other lasers are contemplated by Applicant.

Lasers are classified for safety purposes based on their potential for causing injury to humans' eyes and skin. Most laser products are required by law to have a label listing the Class. It will be listed either in Arabic numerals (1 2, 3R, 3B, 4) or in Roman numerals (I, II, IIIa, IIIb, IV). For visible-beam consumer lasers, there are four main classes: Class 2, Class 3R, Class 3B and Class 4. The first two Classes are relatively safe for eye exposure and the last two are hazardous. As such, the laser component 112 described herein comprises a Class 2 or a Class 3R laser.

A computing device 116 and another computing device 138 are also depicted in FIG. 1. Each of the computing device 116 and the other computing device 138 may be a computer, a laptop computer, a smartphone, and/or a tablet, among other examples not explicitly listed herein. Further, each of the computing device 116 and the other computing device 138, in general, includes one or more processors, one or more memories, and one or more computer-readable hardware storage devices, such that the one or more computer-readable hardware storage devices contain program code executable by the one or more processors via the one or more memories to implement a method. Additionally, each of the computing device 116 and the other computing device 138 also include an engine 120 and a graphical user interface (GUI) 118. In examples, the engine 120 may be an application, a software program, a service, or a software platform configured to be executable on the computing device 116 and the other computing device 138.

A laser beam of the laser component 112 exits the body component of the occupation device 108 at a location 130. When the laser beam is unbroken/uninterrupted (e.g., the child 106 is not determined to be occupying the car seat 104), the electrical components 110 transmit a first alert 140 to the engine 120 of the computing device 116. When the laser beam is broken/interrupted (e.g., by the child 106 occupying the car seat 104), the electrical components 110 transmit a second alert 142 to the engine 120 of the computing device 116. The GUI 118 may display the first alert 140 or the second alert 142 to a user 114.

Each of the first alert 140 and the second alert 142 include textual data, visual data, or audio data to alert the user 114, who interacts with the computing device 116, of the absence or the presence of the child 106 in the car seat 104. The first alert 140 may be distinguished from the second alert 142 by text, visual data, and/or audio data. In some examples, the engine 120 may transmit the first alert 140 and/or the second alert 142 to a database 122 for storage or to the other computing device 138 for review by a third-party.

Figure 5:
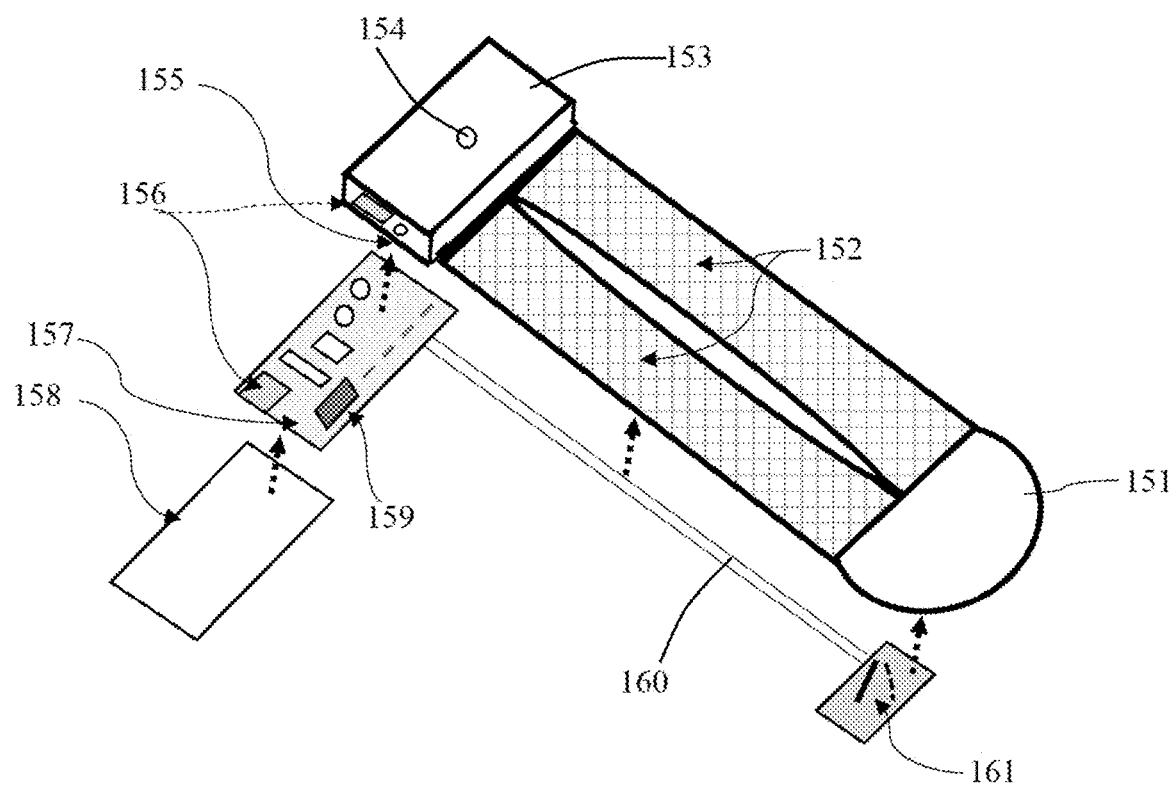
FIG. 5 shows an embodiment showing the disassembled Forget Me Not device.

As shown in FIG. 5, another embodiment is shown that comprises a means of determining the occupancy of a child car seat in a vehicle. In this embodiment, the Forget Me Not device works by use of RFID (radio frequency identification) technology and its communication with a FOB. In an embodiment, the RFID related Forget Me Not device allows for the wireless discovery and tracking of an object using high frequency radio waves. In a variation, and at its most basic level, the present RFID related Forget Me Not device comprises a tag and a receiver. The RFID technology works by sending radio waves to tags, which contain one or more electronic chips. Associated with tags and the technology are readers that that receive the signals and convert the information that is sent by radio waves to a useful information. The radio waves then pass through a specially designed interface that allows the data to be analyzed by a computer system.

In FIG. 5, a pressure switch is shown that turns the power on to a laser distance sensor. The laser distance sensor sends out a beam that hits the inside wall of the cover. The laser distance sensor then sends power to the communication signal. When the FOB is out of range of the RFID board that is providing the communication signal, the FOB will alarm.

In an embodiment and as shown in FIG. 5, there is a seat cushion 151 that will be connected to an on/off pressure switch 161 and via connecting straps 152, they are connected to a cover 153, a power light 154, a charging light 155, USB charging ports 156, an RFID board 157, a back cover 158, a laser distance sensor 159, and a power wire 160 to the on/off pressure switch.

When the child/baby sits on the seat cushion, the on/off pressure switch 161 is turned on and the on/off power switch is operationally connected through power wire 160 to turn on the laser distance sensor 159. A laser beam is generated, which is sensed by the laser distance sensor 159. The laser distance sensor 159 is operationally attached to a radio frequency communication signal generator, which sends a radio frequency communication signal to a FOB. When the person carrying the FOB gets to a point where the radio frequency communication signal is not detected, the FOB lets out an alarm signal alerting the FOB carrier that the seat is still occupied.

Other electric components may be present on both the Forget me Not device and the FOB. They include but are not limited to one or more of a radio frequency generator, an amplifier, a transponder, a scanning antenna, a transceiver, fuses, electronics for passive tags, electronics for active tags, electronics for semi-passive tags, a power source, electronics to generate different frequency bands such as a low-frequency band, a high-frequency band, and an ultra-high frequency band, load modulation electronics, backscattered modulation equipment, electronics for radiofrequency readers, processors, and the computer system equipment enumerated below.

Figure 6:
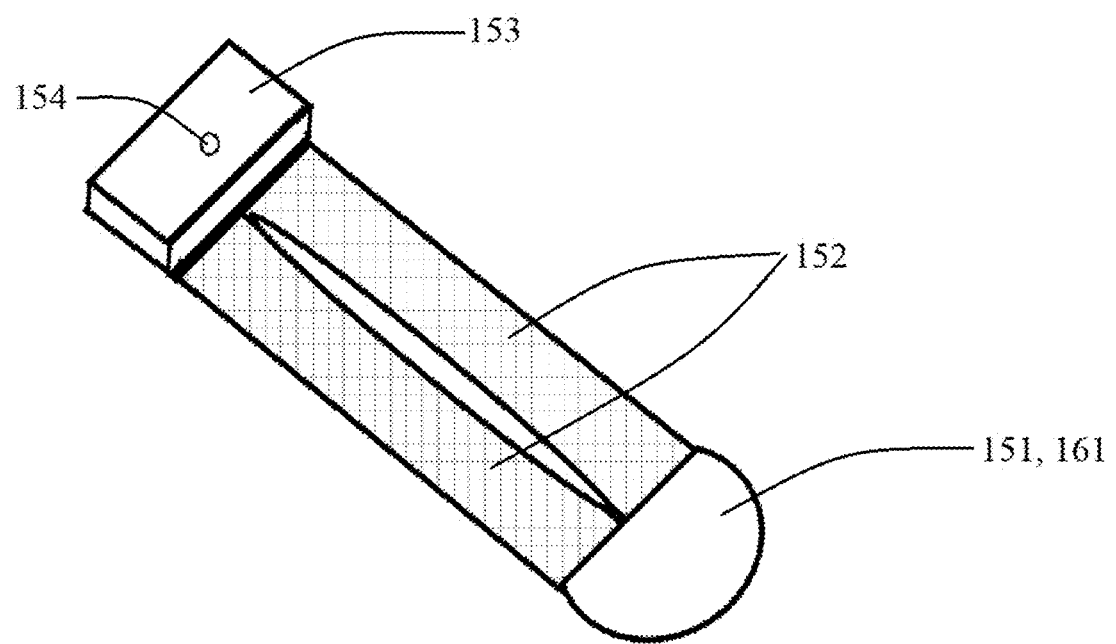
FIG. 6 shows an embodiment showing the assembled Forget Me Not device.

FIG. 6 shows the device in its assembled state with the seat cushion 151 that has the on/off pressure switch attached to the bottom (so the switch is not seen). The cover and back cover are assembled with the laser distance sensor inside the box that is attached to the seat cushion 151 by the connecting straps 152. In an embodiment, if the power light 154 is illuminated, that means that the device is working. It should be understood that the power light 154 may have different light colors that can mean different things. For example, if the light is green, that means that the device is working as intended. If the light is yellow, that may indicate that there is a problem with the laser beam or some other functionality. The light may also flash or remain steadily on and flashing may indicate that some functionality on the device is not working as intended. The pattern of the flash may indicate to the user what problem the device is detecting. For example, two quick flashes in succession may mean that the on/off power switch is not working as intended whereas three quick flashes in succession may meant that the laser distance sensor is not working as intended.

Figure 7:
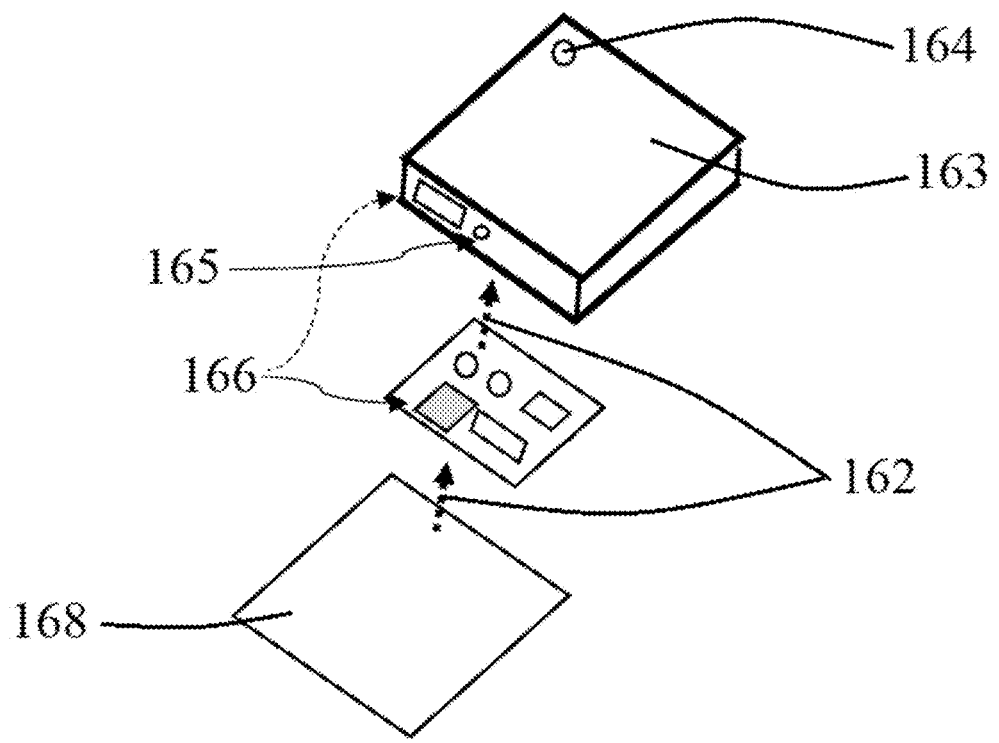
FIG. 7 shows an embodiment showing the disassembled FOB that is associated with the Forget Me Not device.

FIG. 7 shows a blow-up of an embodiment of the disassembled FOB of the invention. The FOB receives the communication signal from the Forget Me Not device (as shown in FIGS. 5 and 6). Once the FOB is out of range for the communication signal from the Forget Me Not device, an alarm in the FOB will sound to let the FOB owner know that the child seat is still occupied. In FIG. 7, the FOB comprises a FOB cover 163, a FOB back cover 168, a FOB charging light 165, FOB USB charging ports 166, and a key ring hole 164 (so the FOB can be attached to a key ring). The disassembled FOB can be connected together as shown by arrows 162.

Figure 8:
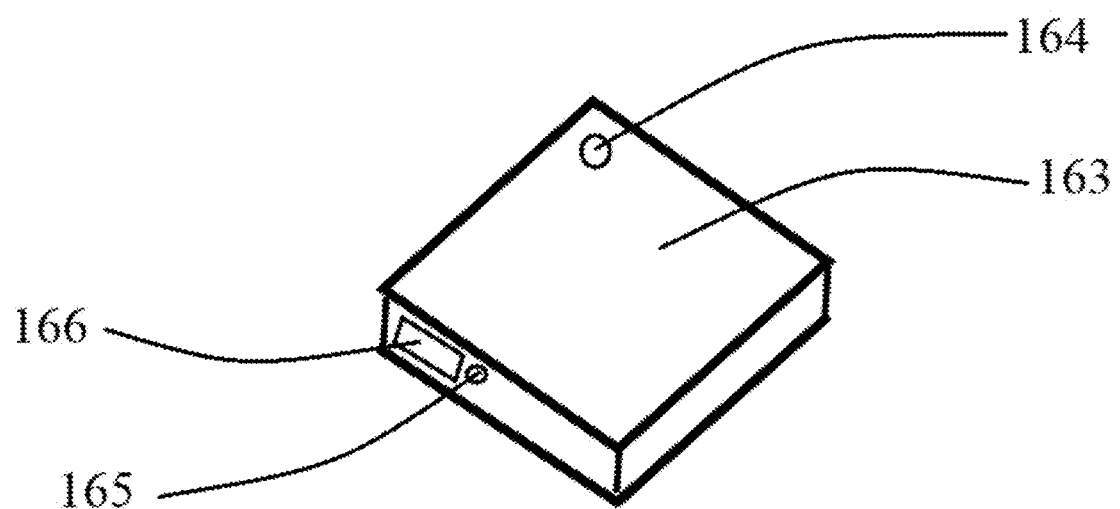
FIG. 8 shows an embodiment showing the assembled FOB that is associated with the Forget Me Not device.

FIG. 8 shows the assembled FOB showing the key ring hole 164, the FOB cover 163, the FOB charging light 165, and a FOB USB charging port 166.

In an embodiment, the present invention also relates to methods of determining whether a child/baby seat is occupied using the one or more devices of the present invention, and methods of making said devices.

Computer System

Figure 4:
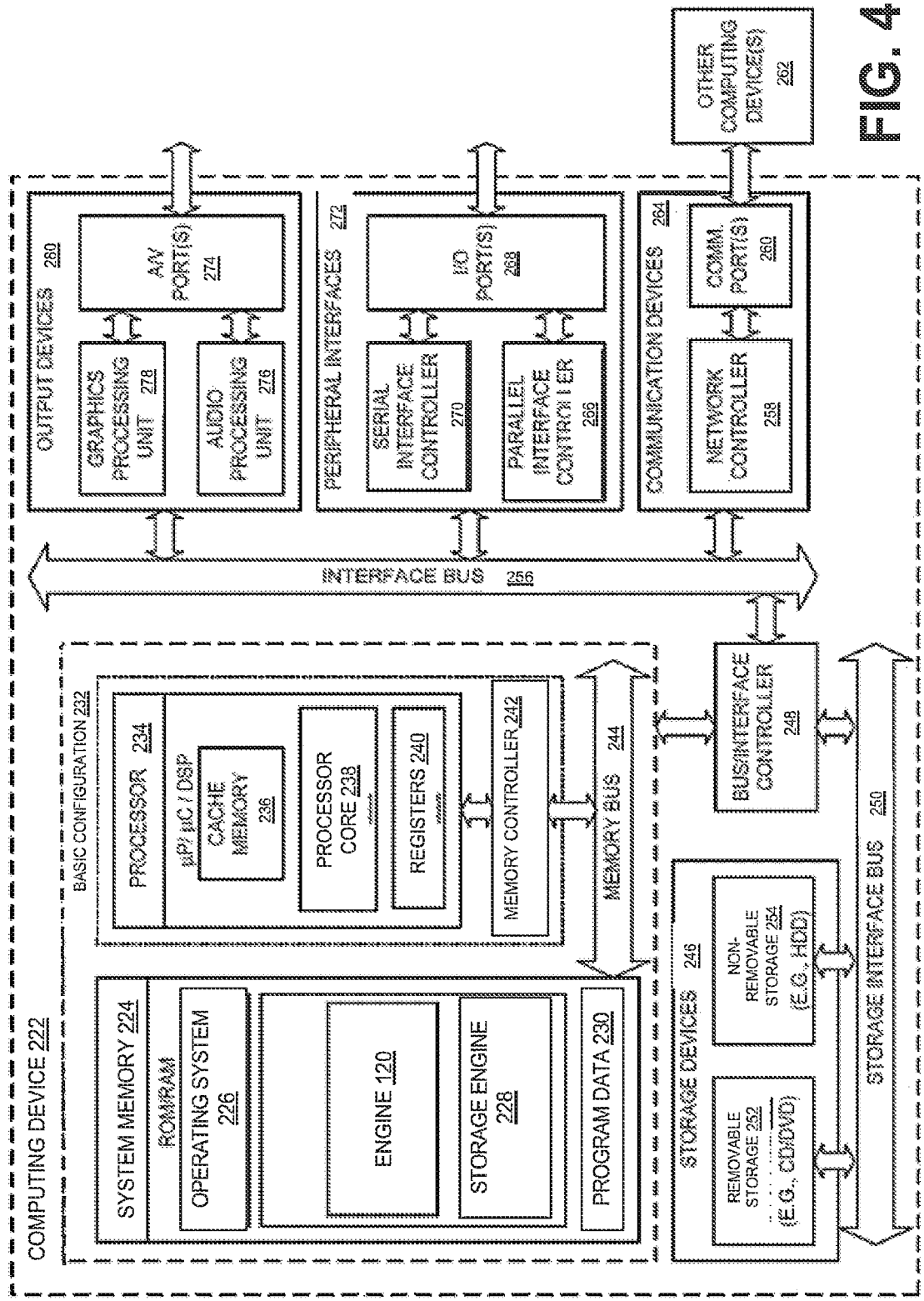
FIG. 4 is a block diagram of a computing device included within the system of FIG. 1, in accordance with embodiments of the present invention.

As shown in FIG. 4, in some embodiments, the present invention may be a computer system, a method, and/or the computing device 116 (of FIG. 1) or the computing device 222 (of FIG. 4). A basic configuration 232 of a computing device 222 is illustrated in FIG. 4 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (µP), a microcontroller (µC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as the engine 120, and program data 230. In some embodiments, the engine 120 may be an application, a software program, a service, or a software platform, as described infra. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

It should be understood that any feature disclosed above can be combined with any other feature (as long as they are not incompatible with each other). All references cited herein are incorporated by reference in their entireties for all purposes. Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An occupation device affixed to a car seat in a vehicle, the occupation device being configured to determine a presence or an absence of a child in the car seat, the occupation device comprising:
    a pressure switch coupled to the car seat;
    a laser distance sensor operably coupled to the pressure switch,
        wherein the laser distance sensor is housed in a cover, and
        wherein activation of the pressure switch activates the laser distance sensor;
    a laser operably coupled to the laser distance sensor, the laser configured to emit a laser beam upon activation of the laser distance sensor,
        wherein the laser beam is configured to impact a wall of the cover;
    one or more connecting straps connecting the pressure switch to the laser and laser distance sensor;
    one or more electrical components operably coupled to the laser distance sensor.

2. The occupation device of claim 1, wherein the laser beam is configured to impact an inner wall of the cover.

3. The occupation device of claim 1, wherein the laser beam is configured to activate a communication signal.

4. The occupation device of claim 1, wherein the laser distance sensor is coupled to a radio frequency signal generator.

5. The occupation device of claim 3, wherein the communication signal comprises at least one of textual data, visual data, and audio data.

6. The occupation device of claim 3, wherein the communication signal is configured to be transmitted to a FOB.

7. The occupation device of claim 1, further comprising a power light.

8. A system comprising:
    a computing device comprising at least:
        an engine; and
        a graphical user interface (GUI); and
    an occupation device affixed to a car seat in a vehicle, the occupation device being configured to determine a presence or an absence of a child in the car seat, the occupation device comprising:
    a pressure switch coupled to the car seat;
    a laser distance sensor operably coupled to the pressure switch,
        wherein the laser distance sensor is housed in a cover, and
        wherein activation of the pressure switch activates the laser distance sensor;
    a laser operably coupled to the laser distance sensor, the laser configured to emit a laser beam upon activation of the laser distance sensor,
        wherein the laser beam is configured to impact a wall of the cover;
    a radio frequency signal generator coupled to the laser distance sensor,
        wherein the radio frequency signal generator is configured to emit a communication signal;
    one or more connecting straps connecting the pressure switch to the laser and laser distance sensor;
    one or more electrical components operably coupled to the laser distance sensor; and
    wherein when the computing device no longer receives the communication signal while the laser beam is activated, an alert is generated by the computing device.

9. A system comprising:
    a portable FOB comprising:
    a computing device,
    an engine, and
        a graphical user interface (GUI); and
    an occupation device affixed to a car seat in a vehicle, the occupation device being configured to determine a presence or an absence of a child in the car seat, the occupation device comprising:
    a pressure switch coupled to the car seat;
    a laser distance sensor operably coupled to the pressure switch,
        wherein the laser distance sensor is housed in a cover, and
        wherein activation of the pressure switch activates the laser distance sensor;
    a laser operably coupled to the laser distance sensor, the laser configured to emit a laser beam upon activation of the laser distance sensor,
        wherein the laser beam is configured to impact an inner wall of the cover;
    a radio frequency signal generator coupled to the laser distance sensor,
        wherein the radio frequency signal generator is configured to emit a communication signal;

one or more connecting straps connecting the pressure switch to the laser and laser distance sensor;
one or more electrical components operably coupled to the laser distance sensor; and
wherein when the portable FOB no longer receives the communication signal while the laser beam is activated, an alert is generated by the FOB.

* * * * *